United States Patent
Xue et al.

(10) Patent No.: US 11,205,070 B2
(45) Date of Patent: Dec. 21, 2021

(54) METHOD, AN APPARATUS, A DISPLAY DEVICE AND A STORAGE MEDIUM FOR POSITIONING A GAZE POINT

(71) Applicants: Beijing BOE Optoelectronics Technology Co., Ltd., Beijing (CN); BOE Technology Group Co., Ltd., Beijing (CN)

(72) Inventors: Yachong Xue, Beijing (CN); Hao Zhang, Beijing (CN); Lili Chen, Beijing (CN); Jiankang Sun, Beijing (CN); Minglei Chu, Beijing (CN); Huidong He, Beijing (CN); Shuo Zhang, Beijing (CN); Gang Li, Beijing (CN); Xiangjun Peng, Beijing (CN); Chenxi Zhao, Beijing (CN); Yaoyu Lv, Beijing (CN)

(73) Assignees: Beijing BOE Optoelectronics Technology Co., Ltd., Beijing (CN); BOE Technology Group Co., Ltd., Beijing (CN)

(*) Notice: Subject to any disclaimer, the term of this patent is extended or adjusted under 35 U.S.C. 154(b) by 73 days.

(21) Appl. No.: 16/634,227

(22) PCT Filed: May 31, 2019

(86) PCT No.: PCT/CN2019/089627
§ 371 (c)(1),
(2) Date: Jan. 27, 2020

(87) PCT Pub. No.: WO2020/140387
PCT Pub. Date: Jul. 9, 2020

(65) Prior Publication Data
US 2021/0073509 A1    Mar. 11, 2021

(30) Foreign Application Priority Data

Jan. 2, 2019 (CN) .......................... 201910002204.1

(51) Int. Cl.
*G06K 9/00* (2006.01)
*G06T 7/174* (2017.01)
(Continued)

(52) U.S. Cl.
CPC ....... *G06K 9/0061* (2013.01); *G02B 27/0101* (2013.01); *G06F 3/013* (2013.01);
(Continued)

(58) Field of Classification Search
CPC .. G06F 3/013; G06K 9/0061; G06K 9/00604; G06K 9/00597; G02B 27/0101; G06T 2207/30041; G06T 7/174
See application file for complete search history.

(56) References Cited

U.S. PATENT DOCUMENTS 9,957,650 B1    5/2018  Roussell
2003/0086057 A1*   5/2003  Cleveland ............ G06K 9/0061
                                                351/204
(Continued)

FOREIGN PATENT DOCUMENTS

CN    103176607 A    6/2013
CN    103514462 A    1/2014
(Continued)

OTHER PUBLICATIONS

ISR & WO in PCT/CN2019/089627.
OA1 in CN201910002204.1.
OA2 in CN201910002204.1.

*Primary Examiner* — Dakshesh D Parikh
(74) *Attorney, Agent, or Firm* — IPro, PLLC

(57) ABSTRACT

Disclosed herein includes a method, an apparatus, a display device and storage medium storing computer executable instructions for positioning a gaze point. The method for obtaining a gaze point in a display device may comprise capturing a real time eye image, obtaining a real time pupil (Continued)

center point from the real time eye image, determining a gaze target zone based on the real time pupil center point and obtaining a gaze point on a target screen generated by the display device based on the real time pupil center point and a mapping ratio for the gaze target zone.

13 Claims, 9 Drawing Sheets

(51) Int. Cl.
    *G02B 27/01*     (2006.01)
    *G06F 3/01*     (2006.01)

(52) U.S. Cl.
    CPC .......... *G06K 9/00604* (2013.01); *G06T 7/174* (2017.01); *G06T 2207/30041* (2013.01)

(56) References Cited

U.S. PATENT DOCUMENTS

| | | | |
|---|---|---|---|
| 2013/0169530 A1* | 7/2013 | Bhaskar | G06F 3/013 345/157 |
| 2015/0169054 A1 | 6/2015 | Wheeler et al. | |
| 2015/0309567 A1 | 10/2015 | Park et al. | |
| 2018/0125404 A1 | 5/2018 | Bott et al. | |
| 2018/0295350 A1* | 10/2018 | Liu | G06T 19/006 |
| 2018/0335840 A1* | 11/2018 | Lin | G06K 9/036 |
| 2019/0121427 A1* | 4/2019 | Qin | G06F 3/013 |

FOREIGN PATENT DOCUMENTS

| | | |
|---|---|---|
| CN | 105138965 A | 12/2015 |
| CN | 105812778 A | 7/2016 |
| CN | 109656373 A | 4/2019 |
| WO | 2020140387 A1 | 7/2020 |

* cited by examiner

METHOD, AN APPARATUS, A DISPLAY DEVICE AND A STORAGE MEDIUM FOR POSITIONING A GAZE POINT

TECHNICAL FIELD

The disclosure herein relates to the technical field of intelligent display, particularly relates to a method, an apparatus, a display device and a storage medium for positioning a gaze point.

BACKGROUND

With the development of virtual reality (VR) technology, attention has been paid to application of non-invasive eye tracking technology in areas such as virtual reality interactivity, foveated rendering, etc.

SUMMARY

Disclosed herein is a method for obtaining a gaze point in a display device, comprising: capturing a real time eye image; obtaining a real time pupil center point from the real time eye image; determining a gaze target zone based on the real time pupil center; and obtaining a gaze point on a target screen generated by the display device based on the real time pupil center point and a mapping ratio for the gaze target zone.

According to an embodiment, the method further comprises: dividing the target screen into a plurality of zones and obtaining a respective mapping ratio for each of the plurality of zones.

According to an embodiment, the method further comprises: capturing a plurality of reference eye images each being of an eye looking at one of a plurality of preset points on the target screen; and obtaining a plurality of pupil center points each for one of the plurality of reference eye images.

According to an embodiment, the plurality of preset points on the target screen comprise a center point and a plurality of peripheral points, the plurality of pupil center points correspondingly comprise a central pupil center point and a plurality of peripheral point pupil center points, and each of the plurality of zones is formed by a first straight line from the central pupil center point passing through a first peripheral point pupil center point, and a second straight line from the central pupil center point passing through an adjacent peripheral point pupil center point.

According to an embodiment, each of the plurality of zones comprises a respective pupil center point triangle formed by the central pupil center point, the first peripheral point pupil center point, and the adjacent peripheral point pupil center point, the plurality of preset points also form corresponding preset point triangles each formed by the center point, a peripheral point and an adjacent peripheral point of the plurality of preset points, and the respective mapping ratio for each of the plurality of zones is an average of three side length ratios each being a side length of one side of a pupil center point triangle over a side length of a corresponding side of a corresponding preset point triangle.

According to an embodiment, the plurality of peripheral points form a regular polygon centered on the center point.

According to an embodiment, the method further comprises obtaining a plurality of corrected pupil center points and obtaining a corrected real time pupil center point.

According to an embodiment, each of the plurality of corrected pupil center points and the corrected real time pupil center point comprises a first corrected pupil center coordinate and a second corrected pupil center coordinate, the obtaining a corrected pupil center point of the plurality of pupil center points and the real time pupil center point comprises: obtaining an eye ball radius r; and obtaining the first corrected pupil center coordinate as $r*x/\sqrt{r^2-x^2}$ and the second corrected pupil center coordinate as $r*y/\sqrt{r^2-y^2}$, x and y are x-axis and y-axis coordinates of one of the plurality of pupil center points and the real time pupil center point before correction, "*" is multiplication, "/" is division and sqrt is square root, the first corrected pupil center coordinate has a same +/− sign as x and the second corrected pupil center coordinate has a same +/− sign as y.

According to an embodiment, to obtain one pupil center point of the plurality of pupil center points and the real time pupil center point further comprises: obtaining a grayscale converted image from a respective eye image; performing a binarization operation and an opening operation on the grayscale converted image; obtaining a pupil contour after the binarization operation and opening operation on the grayscale converted image; and obtaining the pupil center point using a centroid method on the pupil contour.

According to an embodiment, to obtain one pupil center point of the plurality of pupil center points and the real time pupil center point further comprises denoising the grayscale converted image.

According to an embodiment, coordinates of each of the plurality of pupil center points are in a coordinate system of a plane corresponding to one of the plurality of reference eye images, coordinates of the real time pupil center point are in a coordinate system of a plane corresponding to the real time eye image, coordinates of each of the plurality of corrected pupil center points are in a coordinate system of a unfolded plane of the eye ball, coordinates of the corrected real time pupil center point are in a coordinate system of the unfolded plane of the eye ball.

Disclosed herein is a display device, comprising a computer readable storage medium for storing computer instructions and a processor for executing the computer instructions to perform the method.

Disclosed herein is a computer program product comprising a non-transitory computer readable storage medium having instructions recorded thereon, the instructions when executed by a processor implementing the method.

Disclosed herein is an apparatus comprising: a display device to generate a target screen; a camera to capture eye images; a computer readable storage medium to store instructions; and a processor adapted to execute the instructions to perform a method of: capturing a real time eye image using the camera; obtaining a real time pupil center point from the real time eye image; determining a gaze target zone based on the real time pupil center; and obtaining a gaze point on the target screen based on the real time pupil center point and a mapping ratio for the gaze target zone.

According to an embodiment, the method further comprises: dividing the target screen into a plurality of zones; obtaining a respective mapping ratio for each of the plurality of zones; capturing, using the camera, a plurality of reference eye images each being of an eye looking at one of a plurality of preset points on the target screen; and obtaining a plurality of pupil center points each for one of the plurality of reference eye images.

According to an embodiment, the plurality of preset points on the target screen comprise a center point and a plurality of peripheral points, the plurality of pupil center points correspondingly comprise a central pupil center point and a plurality of peripheral point pupil center points, and each of the plurality of zones is formed by a first straight line from the central pupil center point passing through a first peripheral point pupil center point, and a second straight line from the central pupil center point passing through an adjacent peripheral point pupil center point.

According to an embodiment, each of the plurality of zones comprises a respective pupil center point triangle formed by the central pupil center point, the first peripheral point pupil center point, and the adjacent peripheral point pupil center point, the plurality of preset points also form corresponding preset point triangles each formed by the center point, a peripheral point and an adjacent peripheral point of the plurality of preset points, and the respective mapping ratio for each of the plurality of zones is an average of three side length ratios each being a side length of one side a pupil center point triangle over a side length of a corresponding side of a corresponding preset point triangle.

According to an embodiment, the plurality of peripheral points form a regular polygon centered on the center point.

According to an embodiment, the method further comprises obtaining a plurality of corrected pupil center points and obtaining a corrected real time pupil center point.

According to an embodiment, to obtain a corrected pupil center point of the plurality of pupil center points and the real time pupil center point comprises: obtaining an eye ball radius r; and obtaining a first corrected pupil center coordinate as $r*x/\sqrt{r^2-x^2}$ and a second corrected pupil center coordinate as $r*y/\sqrt{r^2-y^2}$, x and y are x-axis and y-axis coordinates of a pupil center point before correction, "*" is multiplication, "/" is division and sqrt is square root, the first corrected pupil center coordinate has a same +/- sign as x and the second corrected pupil center coordinate has a same +/- sign as y.

According to an embodiment, to obtain one pupil center point of the plurality of pupil center points and the real time pupil center point further comprises: obtaining a grayscale converted image from a respective eye image; performing a binarization operation and an opening operation on the grayscale converted image; obtaining a pupil contour after the binarization operation and opening operation on the grayscale converted image; and obtaining the pupil center point using a centroid method on the pupil contour.

According to an embodiment, to obtain one pupil center point of the plurality of pupil center points and the real time pupil center point further comprises denoising the grayscale converted image.

DETAILED DESCRIPTION

At present, a nonlinear mapping model and a method based on cross-ratio mapping are generally used in an eye tracking system. There exists obvious disadvantage for the two methods. Namely, when a pupil moves, by default, it is assumed that the movement of a pupil is global, namely, the mapping relation between a pupil center and a gaze point is global. Thus, the positioning precision of a gaze point is low, and user experience is poor.

Figure 1:
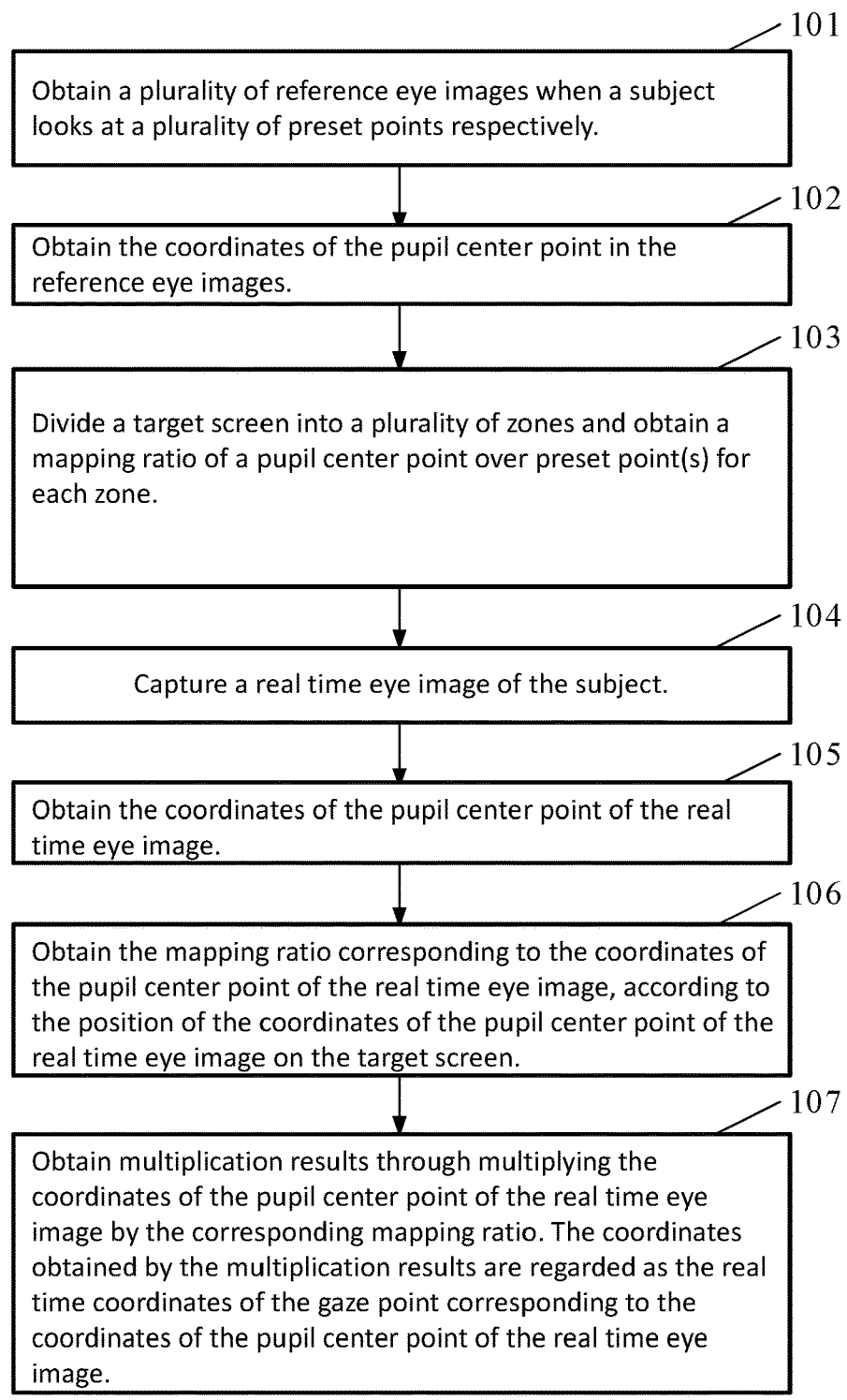
FIG. 1 is a flowchart 1 of a method for positioning a gaze point, according to an embodiment.

As shown in FIG. 1, a method for positioning a gaze point is disclosed herein, according to an embodiment. The method comprises:

Step 101: obtain a plurality of reference eye images when a subject looks at a plurality of preset points respectively.

In an embodiment, the plurality of preset points are displayed on a target screen of a display device. The plurality of preset points may also be referred to as reference points or preset reference points in some embodiments. The subject can be a user using the display device. The display device may be a virtual reality (VR) device, an augmented reality (AR) device, or a mixed reality (MR) device, etc., and there is no limitation for the display device in the disclosure herein.

The plurality of reference eye images are eye images captured when an eye of the subject looks at the plurality of preset points on the screen of the display device (namely, target screen). In practical applications, a five-point calibration method, a seven-point calibration method or a nine-point calibration method may be used. Therefore, in an embodiment, the number of the plurality of preset points may be five, seven or nine, and the number of reference eye images may be five, seven or nine.

Figure 2:
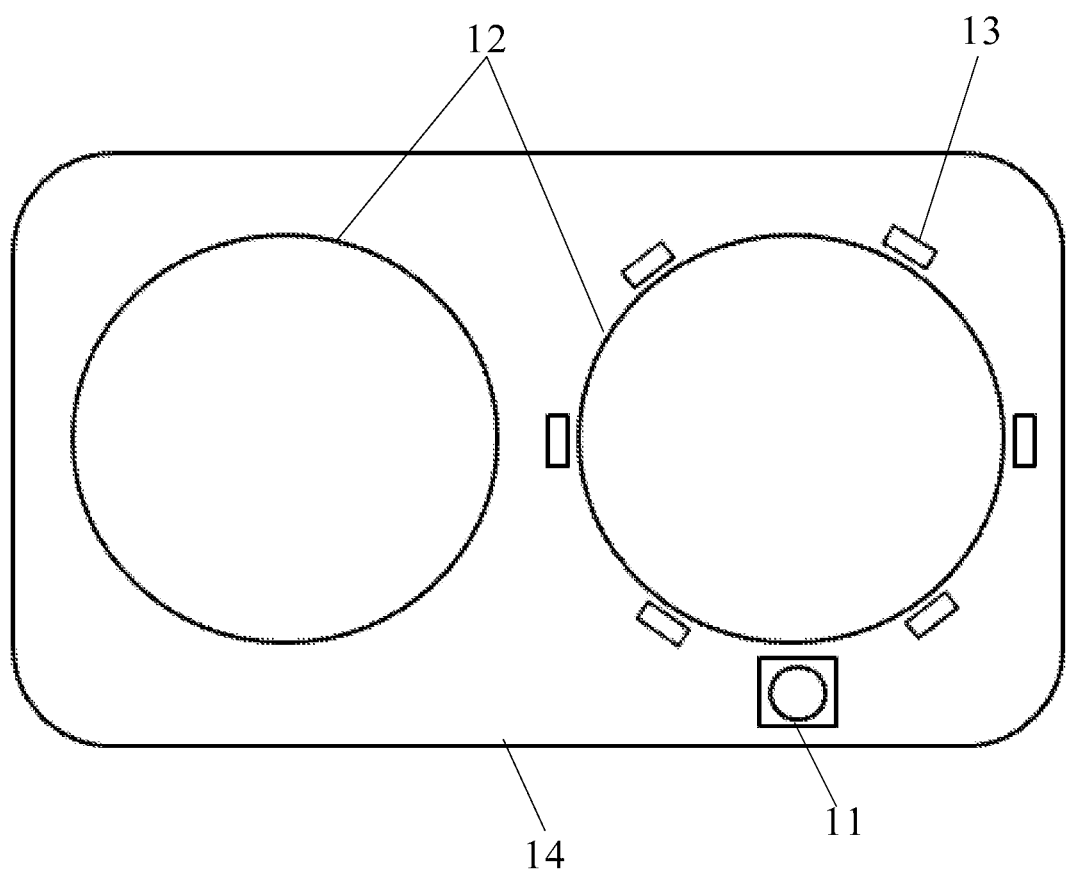
FIG. 2 schematically shows a structural diagram of a display device, according to an embodiment.

Because the environment of a head-mounted display device for virtual reality is relatively closed and dark, in order to distinguish the pupil and the iris in an eye, an infrared light source is generally used as supplemental light. Namely, the plurality of reference eye images may be eye images for an eye irradiated by an infrared light source. In one embodiment, as shown in FIG. 2, the display device comprises: a high-speed infrared camera 11, two Fresnel lenses 12, a plurality of infrared light sources 13 and a body 14. The high-speed infrared camera 11 is arranged under the Fresnel lens 12. The central axis of the camera points to the center position of the eye. The sampling frequency of the camera is generally 100 Hz. The plurality of infrared light sources 13 are distributed around the Fresnel lens 12 in a regular polygon shape. The wavelength of the infrared light source 13 is generally 850 nm. The infrared light source 13 can provide a uniform supplemental light for the eye, to help to distinguish the pupil from the iris region. Thus, a relative clear image for the pupil may be obtained.

Step 102: obtain the coordinates of the pupil center point in the reference eye images.

In various embodiments, different ways to obtain the coordinates of the pupil center point may be used. For example, one or any combinations of edge detection, pattern fitting, angular point detection, centroid method, etc., may be used to obtain the coordinates of the pupil center point. There is no limit for which way to use in the disclosure herein.

It should be noted that the same coordinate system is used for the obtained coordinates of a pupil center point and the coordinates of a preset point on the target screen. Namely, the coordinates of the pupil center point denote the position of the pupil center point on the target screen.

Step 103: divide the target screen into a plurality of zones and obtain a mapping ratio for each zone. In one embodiment, the target screen may be divided into a plurality of zones according to the coordinates of the pupil center point of the plurality of reference eye images. Moreover, the mapping ratio in each zone may be a ratio of the position of a pupil center point over the position of one preset point in a zone, or an average of ratios of the position of a pupil center point over the positions of multiple preset points in a zone.

In the disclosure herein, there is no limit for the way how to divide zones of the target screen, no limit for the number of the divided zones, no limit for specific calculation method of the mapping ratios of different zones. Technical people in the field can select an appropriate method according to actual conditions. For example, by using the coordinates of the pupil center points of the plurality of reference eye images, the target screen may be divided into a plurality of triangular zones, quadrilateral zones or irregular zones, etc., under the condition that the zones do not overlap.

Step 104: capture a real time eye image of the subject.

In an embodiment, the real time eye image is captured under the irradiation by an infrared light source, when the subject uses the display device.

Step 105: obtain the coordinates of the pupil center point of the real time eye image. In an embodiment, this may be to obtain a real time pupil center point from the real time eye image.

Step 106: obtain the mapping ratio corresponding to the coordinates of the pupil center point of the real time eye image, according to the position of the coordinates of the pupil center point of the real time eye image on the target screen.

In an embodiment, this may be to determine a gaze target zone based on the real time pupil center point and obtain the mapping ratio of the gaze target zone. Because the target screen has been divided into a plurality of zones, so that after the coordinates of the pupil center point of a real time eye image are obtained, it may be determined to which zone on the target screen the position of the coordinates of the pupil center of the real time eye image belong. And the mapping ratio of that zone may be obtained.

Step 107: obtain multiplication results through multiplying the coordinates of the pupil center point of the real time eye image by the corresponding mapping ratio. That is, in an embodiment, the gaze point on the target screen may be obtained based on the real time pupil center point and the mapping ratio for the gaze target zone. The coordinates obtained by the multiplication results are regarded as the real time coordinates of the gaze point corresponding to the coordinates of the pupil center point of the real time eye image.

Thus, compared to the technologies currently available, mapping relations between a pupil center point and a corresponding preset point for different zones are established in the disclosure herein. In an embodiment, the coordinates of the real time pupil center point are obtained, the corresponding mapping ratio can be obtained according to the position of the coordinates of the real time pupil center point. Then the corresponding coordinates of the gaze point are obtained. Because the method for calculating the coordinates of a gaze point in an embodiment takes into account the different situations of the pupil when an eye ball moves the gaze in different zones and that the mapping relation between a real time pupil center point and a gaze point changes with the position of the pupil, the positioning precision for a gaze point is improved, and then user experience is further improved.

In some embodiments, obtaining the coordinates of the pupil center point of an eye image may comprise: performing grayscale conversion on the eye image; performing a binarization operation and an opening operation on the grayscale converted image, and obtaining the pupil contour of the processed eye image; obtaining the coordinates of the pupil center point using a centroid method on the pupil contour. Here, the eye image is a reference eye image or a real time eye image.

In order to conveniently process an eye image, to obtain more accurate coordinates of the pupil center point, before the converted eye image is subjected to binarization processing, the method further comprises: denoising the converted eye image; performing a binarization operation and an opening operation on the converted eye image, e.g., performing a binarization operation and an opening operation on the denoised eye image.

Figure 3:
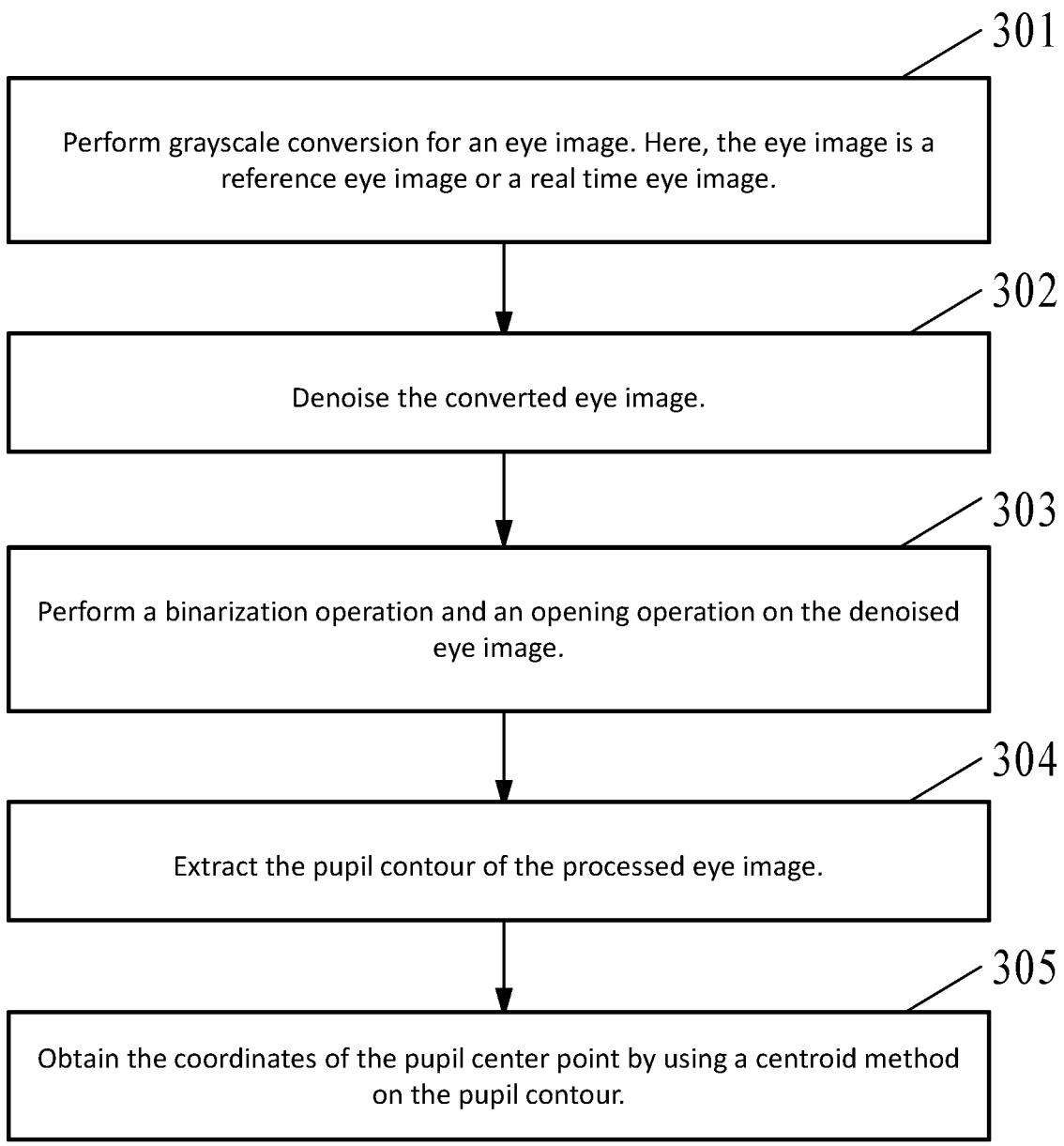
FIG. 3 is a flow chart of a method for obtaining the coordinates of a pupil center point, according to an embodiment.

In other embodiments, as shown in FIG. 3, the method for obtaining the coordinates of the pupil center point of the eye image comprises:

Step 301: perform grayscale conversion for an eye image; here, the eye image is a reference eye image or a real time eye image.

Step 302: denoise the converted eye image.

The denoising process can be a gaussian filtering processing.

Step 303: perform a binarization operation and an opening operation on the denoised eye image.

In an embodiment, the threshold value selected during the binarization processing may be an empirical value. The gray value for the pupil part in the obtained binary image may be 0. Then an opening operation is carried out on the binary image and a white cavity in the pupil may be removed.

Step 304: extract the pupil contour of the processed eye image.

Step 305: obtain the coordinates of the pupil center point by using a centroid method on the pupil contour.

In an embodiment, when an eye looks at a point outside a center zone of the screen of a display device, there may be a difference between the coordinates of the pupil center point of the plane image captured by an infrared camera and the coordinates of the actual pupil center gazing at the point. The reason is that the pupil does not move on a plane; instead, the pupil moves on an approximate spherical surface which is the surface of the eye ball. Thus, there may be an error for the coordinates of the pupil center point obtained according to the positioning based on a reference eye image or a real time eye image obtained. In order to improve the positioning accuracy for the coordinates of a pupil center, correction for the obtained coordinates of the pupil center point is needed.

Figure 4:
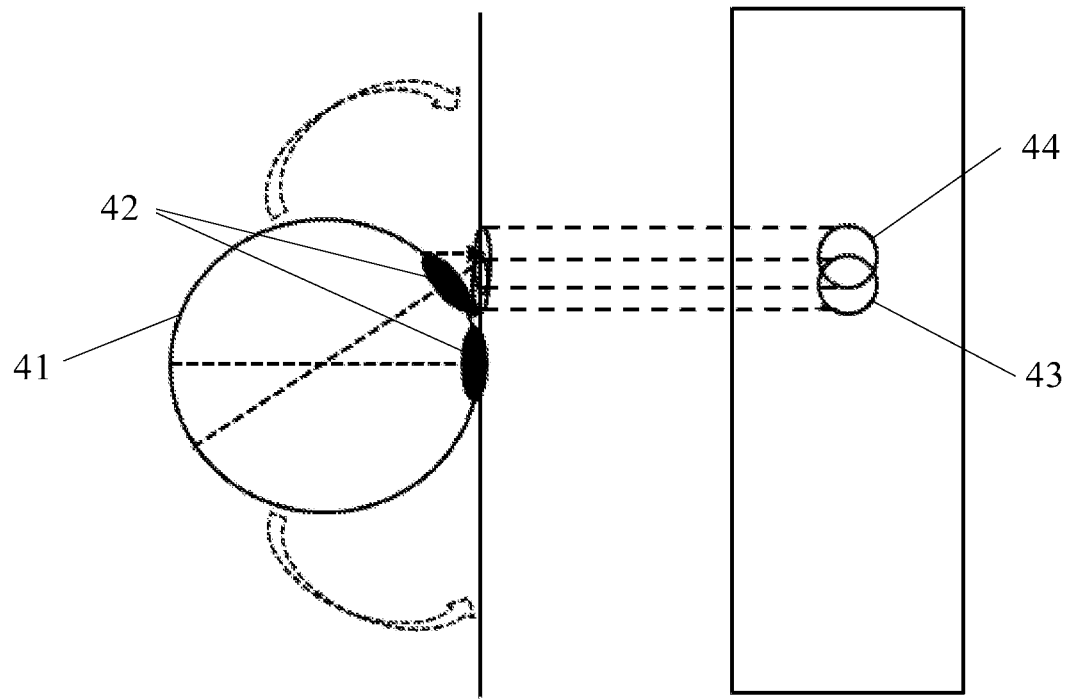
FIG. 4 schematically shows the error of the position of a pupil, according to an embodiment.

As shown in FIG. 4, there exists difference between the position 43 of the pupil 42 of the eye ball 41 on an image captured by a camera and the position 44 on the unfolded plane of the eye ball. Thus, when correction is carried out on the coordinates of a pupil center point, it is needed to establish a corresponding coordinate conversion relation between the camera image plane and the plane formed by unfolding the surface of the eye ball. The coordinates of the pupil center point obtained by the camera image are converted into the coordinates of the pupil center point in a plane formed by unfolding the eye ball surface.

Figure 5:
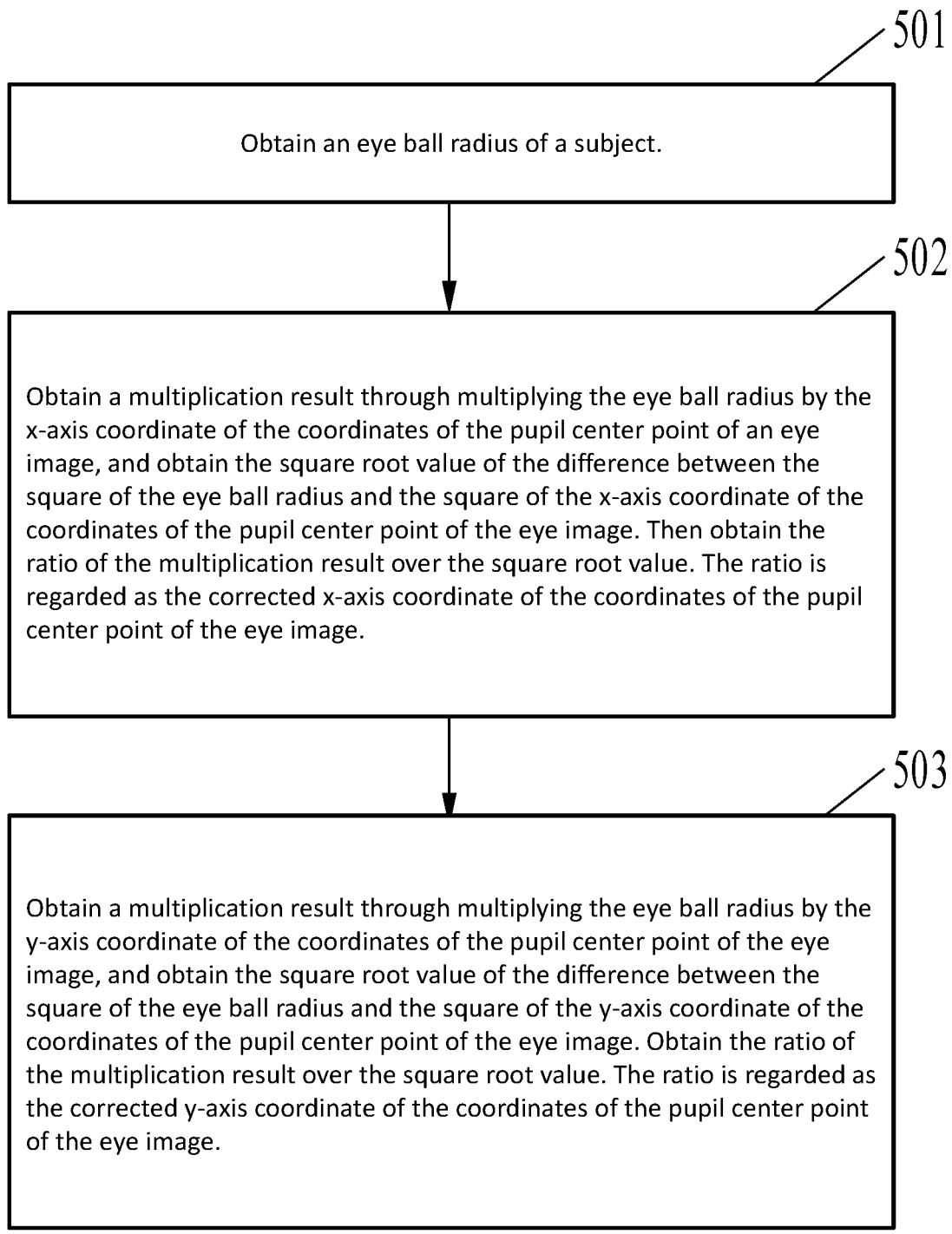
FIG. 5 is a flowchart of a method for correcting the coordinates of a pupil center point, according to an embodiment.

As shown in FIG. 5, the method for correcting the coordinates of the pupil center point of an eye image (a reference eye image or a real time eye image) comprises:

Step 501: obtain an eye ball radius of the subject.

Normally, the size of a human eye does not change again after the age of 13. The diameter of the eye ball is generally 24 mm. Thus, the radius r of the eye ball is generally 12 mm.

Step 502: obtain the multiplication result through multiplying the eye ball radius by the x-axis coordinate of the pupil center point of the eye image, and obtain the square root value of the difference between the square of the eye ball radius and the square of the x-axis coordinate of the pupil center point of the eye image, then obtain the ratio of the multiplication result over the square root value. The ratio is regarded as the corrected x-axis coordinate of the coordinates of the pupil center point of the eye image. Here, the corrected x-axis coordinate of the pupil center point of the eye image has a same +/− sign as the x-axis coordinate of the pupil center of the eye image before the correction.

Figure 6:
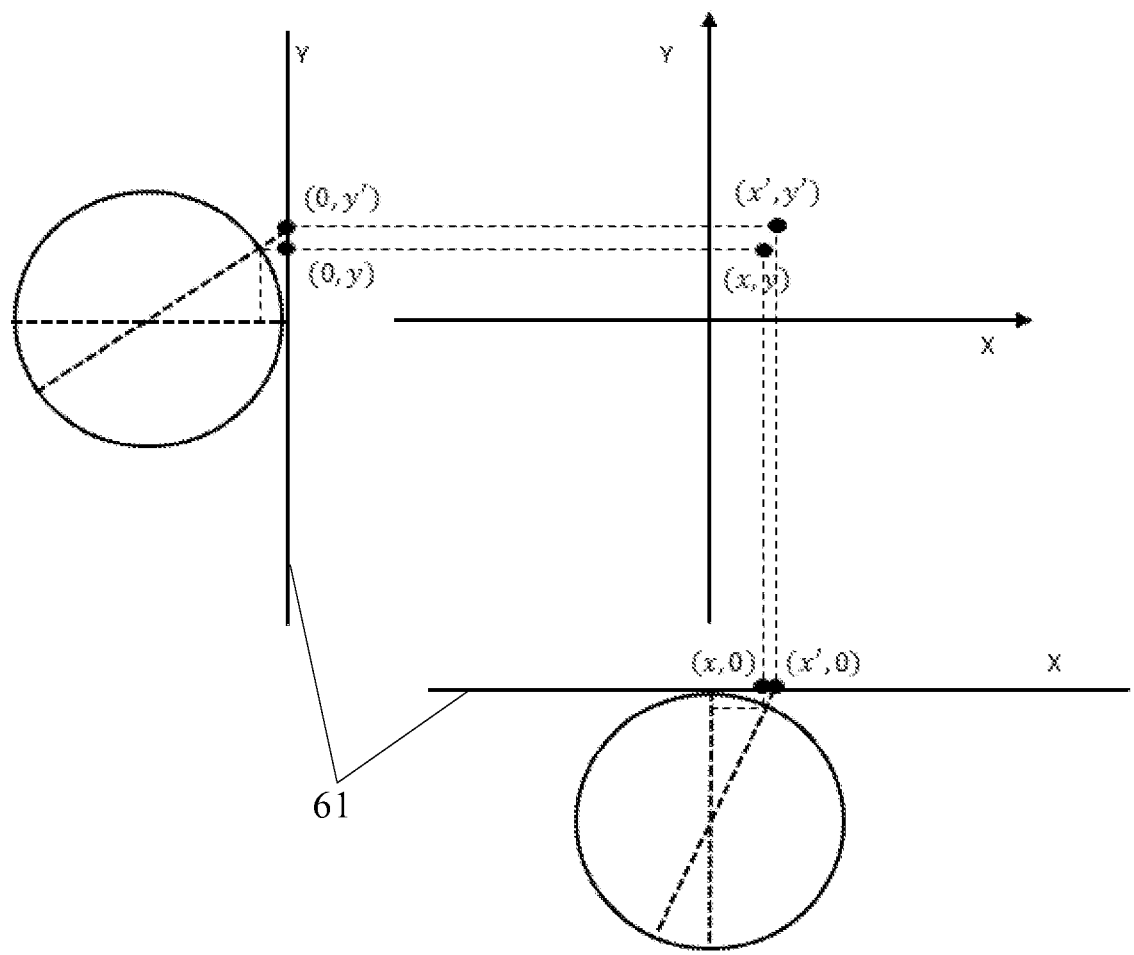
FIG. 6 schematically shows a principle for correcting the coordinates of a pupil center point, according to an embodiment.

As shown in FIG. 6, the coordinates of the pupil in an eye image are (x, y), and the coordinates on the plane 61 formed by unfolding the eye ball is (x', y'). According to the triangle similarity theorems, $$\frac{x'}{r} = \frac{x}{\sqrt{r^2 - x^2}}.$$

Then $$x' = \frac{rx}{\sqrt{r^2 - x^2}}.$$

Here, x' is the corrected x-axis coordinate of the coordinates of the pupil center point of the eye image. x' has a same +/− sign as x.

step 503: obtain a multiplication result through multiplying the eye ball radius by the y-axis coordinate of the pupil center point of the eye image, and obtain the square root value of the difference between the square of the eye ball radius and the square of the y-axis coordinate of the pupil center point of the eye image. Obtain the ratio of the multiplication result over the square root value. The ratio is regarded as the corrected y-axis coordinate of the coordinates of the pupil center point of the eye image. Here, the corrected y-axis coordinate of the pupil center point of the eye image has a same +/− sign as the y-axis coordinate of the pupil center point of the eye image before the correction.

As shown in FIG. 6. according to the triangle similarity theorems, $$\frac{y'}{r} = \frac{y}{\sqrt{r^2 - y^2}}.$$

Then $$y' = \frac{ry}{\sqrt{r^2 - y^2}}.$$

Here, y' is the corrected y-axis coordinate of the coordinates of the pupil center point of the eye image. y' has a same +/− sign as y.

In some embodiments, the target screen may be divided into a plurality of zones based on the coordinates of the pupil center points of the plurality of reference eye images. The coordinates of the plurality of pupil center points may comprise the coordinates of a central pupil center point located at a center and the coordinates of peripheral pupil center points located around the central pupil center point. The target screen may be divided into a plurality of zones by rays each starting from the central pupil center point and passing through one of the peripheral pupil center points. Each zone comprises a first triangle formed by the central pupil center point and two adjacent peripheral pupil center points; and a second triangle formed by the preset point corresponding to the central pupil center point and the preset points corresponding to two adjacent peripheral pupil center points. An average of three side length ratios between the first triangle and the second triangle may be obtained. Each side length ratio may be the ratio of one side length of a side of the second triangle over the side length of a corresponding side of a corresponding first triangle. The average value of the three side length ratios may be regarded as the mapping ratio for a pupil center point in the zone where the first triangle is located.

In one embodiment, the plurality of peripheral pupil center points may be distributed around the central pupil center point in a regular polygon shape with the central pupil center point as the center of the regular polygon shape.

Figure 7:
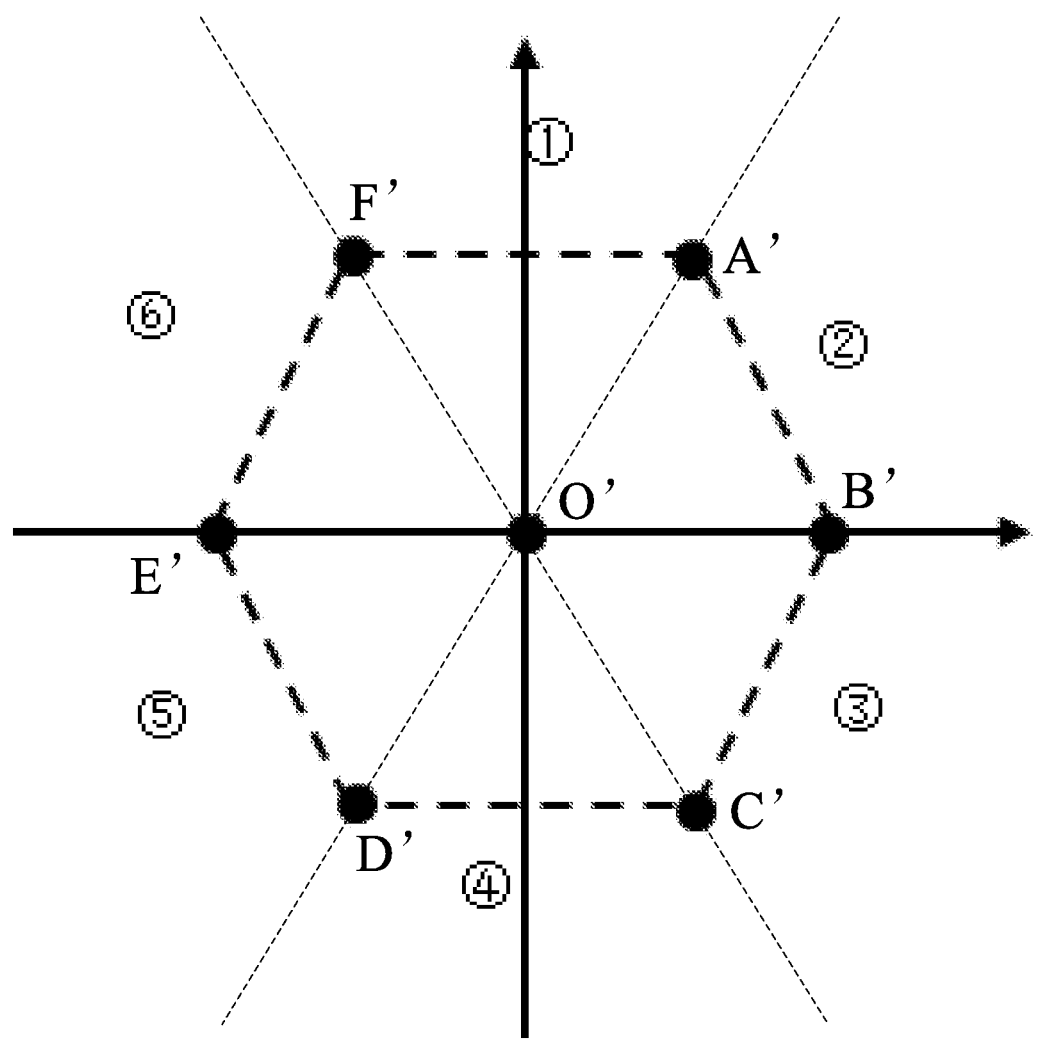
FIG. 7 schematically shows division of a target screen, according to an embodiment.

Using seven preset points as an example, the division of the target screen into zones and the mapping ratio for each zone may be as follows:

FIG. 7 shows seven preset points arranged on the screen of the display device. They are respectively A, B, C, D, E, F, and O. The point O is located at the coordinate origin. A, B, C, D, E, and F are respectively located at a vertex of a regular hexagon. The coordinates of the seven preset points are respectively $(X_A, Y_A)$, $(X_B, Y_B)$, $(X_C, Y_C)$, $(X_D, Y_D)$, $(X_E, Y_E)$, $(X_F, Y_F)$, and $(x_O, Y_O)$. When an eye looks at the seven preset points respectively, e.g., in the order of A-B-C-D-E-F-O, seven reference eye images may be obtained. Thus, the coordinates corresponding to the seven pupil center points, which are $A(x_a, y_a)$, $B(x_b, y_b)$, $C(x_c, y_c)$, $D(x_d, y_d)$, $E(x_e, y_e)$, $F(x_f, y_f)$, $O(x_o, y_o)$ respectively, may be obtained. Correction for the coordinates may be performed to obtain the corrected coordinates of the seven pupil center points, which are $A'(x_A', y_A')$ $B'(x_B', y_B')$, $C'(x_C', y_C')$, $D'(x_D', y_D')$, $E'(x_E', y_E')$, $F'(x_F', y_F')$, $O'(x_O', y_O')$ respectively. The corrected coordinates of the seven pupil center points are distributed on the target screen, as shown in FIG. 7. The target screen is divided into six zones. The lines dividing the screen may be formed by starting from the origin point and passing through one of the six vertexes. For each zone, the mapping ratio is the average value of the ratio of the side length of a side of the first triangle formed by the pupil center points on the target screen over the side length of the corresponding side of the second triangle formed by the corresponding preset points. For example, the ratio of a side of each second triangle to the corresponding side of the corresponding first triangle is represented by h, then $$h_{O'A'} = \frac{\sqrt{(x_A - x_O)^2 + (y_A - y_O)^2}}{\sqrt{(x_A' - x_O')^2 + (y_A' - y_O')^2}}, h_{O'B'} = \frac{\sqrt{(x_B - x_O)^2 + (y_B - y_O)^2}}{\sqrt{(x_B' - x_O')^2 + (y_B' - y_O')^2}},$$

-continued $$h_{O'C'} = \frac{\sqrt{(x_C - x_O)^2 + (y_C - y_O)^2}}{\sqrt{(x'_C - x'_O)^2 + (y'_C - y'_O)^2}}, h_{O'D'} = \frac{\sqrt{(x_D - x_O)^2 + (y_D - y_O)^2}}{\sqrt{(x'_D - x'_O)^2 + (y'_D - y'_O)^2}},$$

$$h_{O'E'} = \frac{\sqrt{(x_E - x_O)^2 + (y_E - y_O)^2}}{\sqrt{(x'_E - x'_O)^2 + (y'_E - y'_O)^2}}, h_{O'F'} = \frac{\sqrt{(x_F - x_O)^2 + (y_F - y_O)^2}}{\sqrt{(x'_F - x'_O)^2 + (y'_F - y'_O)^2}},$$

$$h_{A'B'} = \frac{\sqrt{(x_A - x_B)^2 + (y_A - y_B)^2}}{\sqrt{(x'_A - x'_B)^2 + (y'_A - y'_B)^2}}, h_{B'C'} = \frac{\sqrt{(x_B - x_C)^2 + (y_B - y_C)^2}}{\sqrt{(x'_B - x'_C)^2 + (y'_C - y'_C)^2}},$$

$$h_{C'D'} = \frac{\sqrt{(x_C - x_D)^2 + (y_C - y_D)^2}}{\sqrt{(x'_C - x'_D)^2 + (y'_C - y'_D)^2}}, h_{D'E'} = \frac{\sqrt{(x_D - x_E)^2 + (y_D - y_E)^2}}{\sqrt{(x'_D - x'_E)^2 + (y'_D - y'_E)^2}},$$

$$h_{E'F'} = \frac{\sqrt{(x_F - x_E)^2 + (y_F - y_E)^2}}{\sqrt{(x'_F - x'_E)^2 + (y'_F - y'_E)^2}}, h_{F'A'} = \frac{\sqrt{(x_F - x_A)^2 + (y_F - y_A)^2}}{\sqrt{(x'_F - x'_A)^2 + (y'_F - y'_A)^2}};$$

Then, the mapping ratio of zone ①:

$$h_1 = \frac{h_{O'F'} + h_{O'A'} + h_{F'A'}}{3},$$

in a same way, the mapping ratio of zone ②:

$$h_2 = \frac{h_{O'B'} + h_{O'A'} + h_{A'B'}}{3},$$

the mapping ratio of zone ③:

$$h_3 = \frac{h_{O'B'} + h_{O'C'} + h_{B'C'}}{3},$$

the mapping ratio off zone ④:

$$h_4 = \frac{h_{O'C'} + h_{O'D'} + h_{C'D'}}{3},$$

the mapping ratio off zone ⑤:

$$h_5 = \frac{h_{O'D'} + h_{O'E'} + h_{D'E'}}{3},$$

and the mapping ratio off zone ⑥:

$$h_6 = \frac{h_{O'E'} + h_{O'F'} + h_{E'F'}}{3};$$

thus, the mapping ratios of all the zones are obtained.

Figure 8:
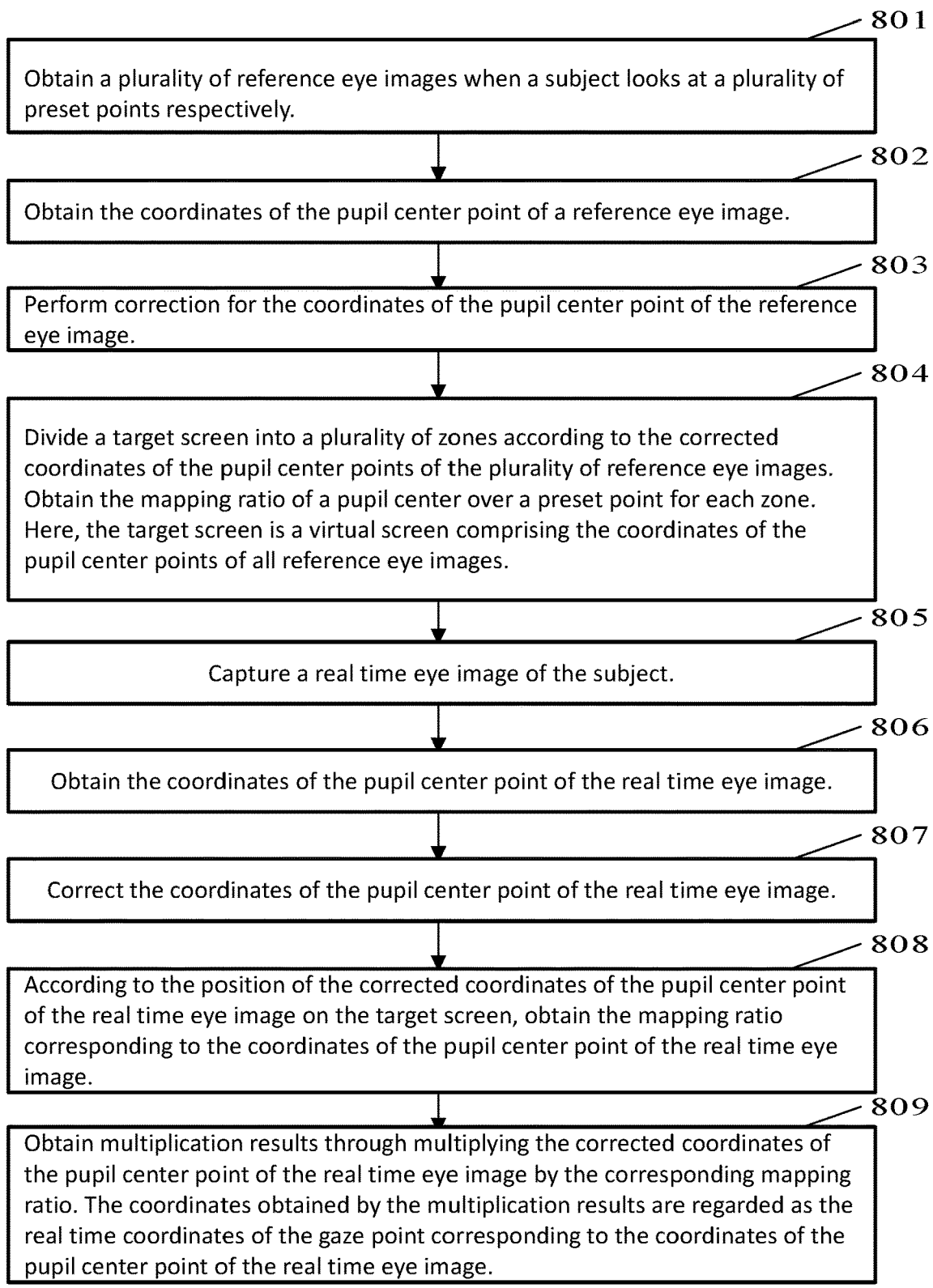
FIG. 8 is a flowchart 2 of a method for positioning a gaze point, according to an embodiment.

According to an embodiment, a method for positioning a gaze point is disclosed herein, as shown in FIG. 8. The method comprises:

Step 801: Obtain a plurality of reference eye images when the subject looks at the plurality of preset points respectively.

Step 802: Obtain the coordinates of the pupil center point of a reference eye image.

Step 803: Perform correction for the coordinates of the pupil center point of the reference eye image.

Step 804: Divide the target screen into a plurality of zones according to the corrected coordinates of the pupil center points of the plurality of reference eye images. Obtain the mapping ratio of a pupil center over a preset point for each zone.

Step 805: Obtain a real time eye image of the subject.

Step 806: Obtain the coordinates of the pupil center point of the real time eye image.

Step 807: Correct the coordinates of the pupil center point of the real time eye image.

Step 808: According to the position of the corrected coordinates of the pupil center point of the real time eye image on the target screen, obtain the mapping ratio corresponding to the coordinates of the pupil center point of the real time eye image.

Step 809: Obtain multiplication results through multiplying the corrected coordinates of the pupil center point of the real time eye image by the corresponding mapping ratio. The coordinates obtained by the multiplication results are regarded as the real time coordinates of the gaze point corresponding to the coordinates of the pupil center point of the real time eye image.

Assume the corrected coordinates of the pupil center point of a real time eye image are (x', y'). Then, a concrete method for obtaining the mapping ratio corresponding to the coordinates of the pupil center is: if $x' > x_O'$ and $$\frac{y'_O - y'_B}{x'_O - x'_B}(x' - x'_O) + y'_O < y' < \frac{y'_O - y'_A}{x'_O - x'_A}(x' - x'_O) + y'_O,$$

then, the coordinates of the pupil center point are located at zone ②, the corresponding mapping ratio is $h_2$, the real time coordinates of the gaze point $G(x, y) = h_2 (x', y')$; if $x' > x_O'$ and $$\frac{y'_O - y'_C}{x'_O - x'_C}(x' - x'_O) + y'_O < y' < \frac{y'_O - y'_B}{x'_O - x'_B}(x' - x'_O) + y'_O,$$

then, the coordinates of the pupil center point are located at zone, the corresponding mapping ratio is $h_3$, the real time coordinates of the gaze point $G(x, y) = h_3*(x', y')$; if $x' < x_O'$ and $$\frac{y'_O - y'_D}{x'_O - x'_D}(x' - x'_O) + y'_O < y' < \frac{y'_O - y'_E}{x'_O - x'_E}(x' - x'_O) + y'_O,$$

then, the coordinates of the pupil center point are located at zone ⑤, the corresponding mapping ratio is $h_5$, the real time coordinates of the gaze point $G(x, y) = h_5*(x', y')$; if $x' < x_O'$ and $$\frac{y'_O - y'_E}{x'_O - x'_E}(x' - x'_O) + y'_O < y' < \frac{y'_O - y'_F}{x'_O - x'_F}(x' - x'_O) + y'_O,$$

then, the coordinates of the pupil center point are located at zone ⑥, the corresponding mapping ratio is $h_6$, the real time coordinates of the gaze point $G(x, y) = h_6*(x', y')$; for the rest situations, if $y' > y_O'$, then, the coordinates of the pupil center point are located at zone ①, the corresponding mapping ratio is $h_1$, the real time coordinates of the gaze point $G(x, y) = h_1*(x', y')$; if $y' < y_o'$, then, the coordinates of the pupil center point are located at zone ④, the corresponding mapping ratio is $h_4$, then the real time coordinates of the gaze point $G(x, y) = h_4*(x', y')$.

Figure 9:
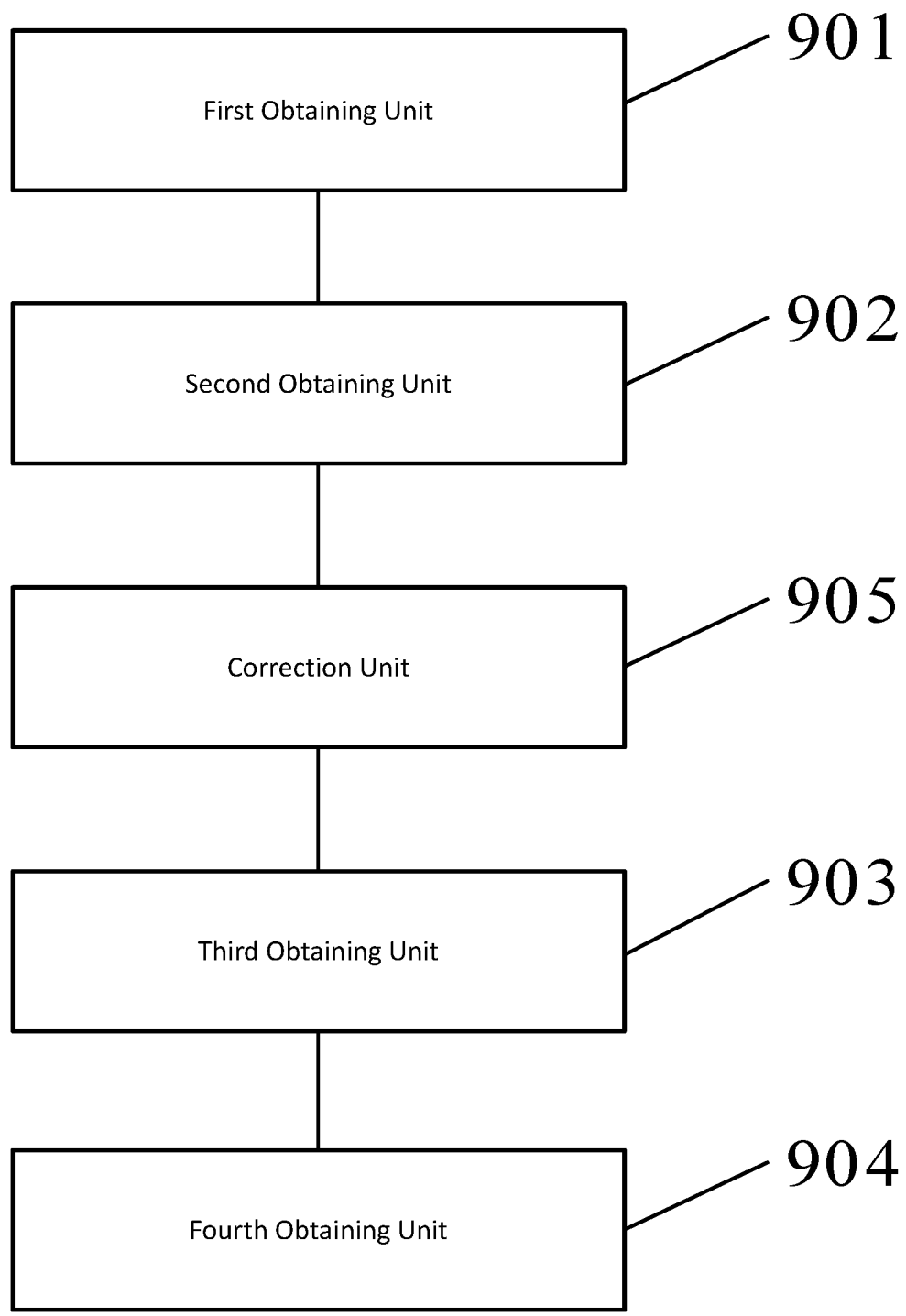
FIG. 9 is a block diagram of a device for positioning a gaze point, according to an embodiment.

An apparatus for positioning a gaze point is disclosed herein, according to another embodiment, as shown in FIG. 9. The apparatus comprises:

A first obtaining unit 901 configured to obtain a plurality of reference eye images when a subject looks at a plurality of preset points respectively.

A second obtaining unit 902 configured to obtain the coordinates of the pupil center point of a reference eye image.

A third obtaining unit 903 configured to divide the target screen into a plurality of zones according to the coordinates of the pupil center points of the plurality of reference eye images and to obtain the mapping ratio of a pupil center point over a preset point for each zone.

The first obtaining unit 901 is further configured to obtain a real time eye image of the subject.

The second obtaining unit 902 is further configured to obtain the coordinates of the pupil center point of the real time eye image.

The third obtaining unit 903 is further configured to obtain the mapping ratio corresponding to the coordinates of the pupil center point of the real time eye image according to the position of the coordinates of the pupil center point of the real time eye image on the target screen.

A fourth obtaining unit 904 configured to obtain multiplication results through multiplying the coordinates of the pupil center point of the real time eye image by the corresponding mapping ratio. The coordinates obtained by the multiplication results are used as the real time coordinates of the gaze point corresponding to the coordinates of the pupil center point of the real time eye image.

Further, the third obtaining unit 903 is concretely used as follows:

The coordinates of the pupil center points of the plurality of reference eye images comprise the coordinates of a central pupil center point located at a center, and the coordinates of the remaining periphery pupil center points located at the periphery around the coordinates of the central pupil center point. The target screen is divided into a plurality of zones by rays each using the coordinates of the central pupil center point as the endpoint and passing the coordinates of any of the periphery pupil center points. Each zone comprises a first triangle formed by the coordinates of the central pupil center point and the coordinates of two adjacent peripheral pupil center points.

A second triangle is formed by the preset point corresponding to the coordinates of the central pupil center point and the preset points corresponding to the coordinates of two adjacent peripheral pupil center points. Obtain an average of three side length ratios each being a side length of one side of the second triangle over a side length of a corresponding side of the first triangle. The average value is used as the mapping ratio of a pupil center point over a preset point for the zone where the first triangle is located.

Further, the coordinates of the plurality of peripheral pupil center points are distributed at the periphery around a center which is the coordinates of the central pupil center point. The coordinates of the plurality of peripheral pupil center points are distributed in a regular polygon shape.

The apparatus further comprises: a correction unit 905 configured for correcting the coordinates of the pupil center point of an eye image of the subject. Here, the eye image is a reference eye image or a real time eye image.

Further, the correction unit 905 can be concretely used as follows: Obtain the eye ball radius of the subject;

Obtain the multiplication result through multiplying the eye ball radius by the x-axis coordinate of the coordinates of the pupil center point of the eye image, and obtain the square root value of the difference between the square of the eye ball radius and the square of the x-axis coordinate of the coordinates of the pupil center point of the eye image. Obtain the ratio of the multiplication result over the square root value. The ratio is used as the corrected x-axis coordinate of the coordinates of the pupil center point of the eye image;

Obtain the multiplication result through multiplying the eye ball radius by the y-axis coordinate of the coordinates of the pupil center point of the eye image, and obtain the square root value of the difference between the square of the eye ball radius and the square of the y-axis coordinate of the coordinates of the pupil center point of the eye image. Obtain the ratio of the multiplication result over the square root value. The ratio is used as the corrected y-axis coordinate of the coordinates of the pupil center point of the eye image;

Here, the corrected x-axis coordinate of the coordinates of the pupil center point of the eye image has a same +/− sign as the x-axis coordinate of the coordinates of the pupil center point of the eye image before the correction; the corrected y-axis coordinate of the coordinates of the pupil center point of the eye image has a same +/− sign as the y-axis coordinate of the coordinates of the pupil center point of the eye image before the correction.

Further, the second obtaining unit 902 is used as follows: perform grayscale conversion for an eye image; perform a binarization operation and an opening operation on the grayscale converted image, and extract the pupil contour of the processed eye image; obtain the coordinates of the pupil center point using a centroid method on the pupil contour. Here, the eye image is a reference eye image or a real time eye image.

Further, the second obtaining unit 902 is concretely used as follows: perform denoising processing for the converted eye image; perform a binarization operation and an opening operation on the denoised eye image.

The introduction of each module in the apparatus for positioning a gaze point can be described with reference to each step in the method for positioning a gaze point. The description is not repeated here.

A display device is disclosed herein, according to an embodiment. The display device comprises: a memory for storing a computer program; a processor for executing the computer program to achieve any of the methods for positioning a gaze point described above. The processor may be a central processing unit (CPU), a graphics processing unit (GPU), a microcontroller, a digital signal processor (DSP), a microprocessor, an application-specific integrated circuit (ASIC), a field-programmable gate array (FPGA), or any suitable electronic component.

A storage medium is disclosed herein, according to another embodiment. The storage medium is configured to store computer instructions. When the computer instructions are executed, one or more steps of any of the methods for positioning a gaze point described above is executed.

The embodiment of the present disclosure further provides a computer readable storage medium, where the computer readable storage medium stores a computer program, and when the computer program is executed by the processor, the image enhancement method based on the Retinex theory provided by the embodiment of the present disclosure is implemented. The steps in the image enhancement method based on the Retinex theory provided by the embodiments of the present disclosure are performed when the computer program is executed by the processor. The computer readable storage medium can be implemented in any type of volatile or non-volatile memory device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, disk or optical disk. The processor can be a central processing unit (CPU) or a field programmable logic array (FPGA) or a microcontroller (MCU) or a digital signal processor (DSP) or a programmable logic device (PLD) or an application specific integrated circuit (ASIC) having data processing capabilities and/or program execution capabilities.

According to the embodiments of the disclose herein, mapping relations between a pupil center point and a corresponding preset point for different zones are established. Thus, after the real time coordinates of a pupil center point are obtained, the corresponding mapping ratio can be obtained according to the position of the real time coordinates of the pupil center point. Then the corresponding real time coordinates of the gaze point are obtained. The method for calculating the real time coordinates of the gaze point takes into account that the situations of movement of the pupil in different zones of an eye ball are different, and the mapping relation between a pupil center point and a gaze point changes with the pupil position. Therefore, the positioning precision of the gaze point is improved, and then user experience is improved.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for obtaining a gaze point in a display device, comprising:
    capturing a real time eye image;
    obtaining a real time pupil center point from the real time eye image;
    determining a gaze target zone based on the real time pupil center point;
    obtaining the gaze point on a target screen generated by the display device based on the real time pupil center point and a mapping ratio for the gaze target zone;
    dividing the target screen into a plurality of zones;
    obtaining a respective mapping ratio for each of the plurality of zones;
    capturing a plurality of reference eye images each being of an eye looking at one of a plurality of preset points on the target screen; and
    obtaining a plurality of pupil center points each for one of the plurality of reference eye images;
    wherein the plurality of preset points on the target screen comprise a center point and a plurality of peripheral points, the plurality of pupil center points correspondingly comprise a central pupil center point and a plurality of peripheral point pupil center points, and each of the plurality of zones is formed by a first straight line from the central pupil center point passing through a first peripheral point pupil center point, and a second straight line from the central pupil center point passing through an adjacent peripheral point pupil center point,
    wherein each of the plurality of zones comprises a respective pupil center point triangle formed by the central pupil center point, the first peripheral point pupil center point, and the adjacent peripheral point pupil center point,
    wherein the plurality of preset points also form corresponding preset point triangles each formed by the center point, a peripheral point and an adjacent peripheral point of the plurality of preset points,
    and the respective mapping ratio for each of the plurality of zones is an average of three side length ratios each being a side length of one side of a pupil center point triangle over a side length of a corresponding side of a corresponding preset point triangle.

2. The method of claim 1, wherein the plurality of peripheral points form a regular polygon centered on the center point.

3. The method of claim 1, further comprising obtaining a plurality of corrected pupil center points and obtaining a corrected real time pupil center point.

4. The method of claim 3, wherein each of the plurality of corrected pupil center points and the corrected real time pupil center point comprises a first corrected pupil center coordinate and a second corrected pupil center coordinate, the obtaining a corrected pupil center point of the plurality of pupil center points and the real time pupil center point comprises:
    obtaining an eye ball radius r; and
    obtaining the first corrected pupil center coordinate as $r*x/\mathrm{sqrt}(r^2-x^2)$ and the second corrected pupil center coordinate as $r*y/\mathrm{sqrt}(r^2-y^2)$, wherein x and y are x-axis and y-axis coordinates of one of the plurality of pupil center points and the real time pupil center point before correction, "*" is multiplication, "/" is division and sqrt is square root,
    wherein the first corrected pupil center coordinate has a same +/− sign as x and the second corrected pupil center coordinate has a same +/− sign as y.

5. The method of claim 4, wherein to obtain one pupil center point of the plurality of pupil center points and the real time pupil center point further comprises:
    obtaining a grayscale converted image from a respective eye image;
    performing a binarization operation and an opening operation on the grayscale converted image;
    obtaining a pupil contour after the binarization operation and opening operation on the grayscale converted image; and
    obtaining the pupil center point using a centroid method on the pupil contour.

6. The method of claim 5, wherein to obtain one pupil center point of the plurality of pupil center points and the real time pupil center point further comprises denoising the grayscale converted image.

7. The method of claim 4, wherein coordinates of each of the plurality of pupil center points are in a coordinate system of a plane corresponding to one of the plurality of reference eye images, coordinates of the real time pupil center point are in a coordinate system of a plane corresponding to the real time eye image, coordinates of each of the plurality of corrected pupil center points are in a coordinate system of a unfolded plane of the eye ball, coordinates of the corrected real time pupil center point are in a coordinate system of the unfolded plane of the eye ball.

8. A computer program product comprising a non-transitory computer readable storage medium having instructions recorded thereon, the instructions when executed by a processor causing the processor to implement the method of claim 1.

9. An apparatus comprising:
a display device to generate a target screen;
a camera to capture eye images;
a computer readable storage medium to store instructions; and
a processor adapted to execute the instructions to perform a method of:
capturing a real time eye image using the camera;
obtaining a real time pupil center point from the real time eye image;
determining a gaze target zone based on the real time pupil center;
obtaining a gaze point on the target screen based on the real time pupil center point and a mapping ratio for the gaze target zone;
dividing the target screen into a plurality of zones;
obtaining a respective mapping ratio for each of the plurality of zones;
capturing, using the camera, a plurality of reference eye images each being of an eye looking at one of a plurality of preset points on the target screen; and
obtaining a plurality of pupil center points each for one of the plurality of reference eye images;
wherein the plurality of preset points on the target screen comprise a center point and a plurality of peripheral points, the plurality of pupil center points correspondingly comprise a central pupil center point and a plurality of peripheral point pupil center points, and each of the plurality of zones is formed by a first straight line from the central pupil center point passing through a first peripheral point pupil center point, and a second straight line from the central pupil center point passing through an adjacent peripheral point pupil center point,
wherein each of the plurality of zones comprises a respective pupil center point triangle formed by the central pupil center point, the first peripheral point pupil center point, and the adjacent peripheral point pupil center point,
wherein the plurality of preset points also form corresponding preset point triangles each formed by the center point, a peripheral point and an adjacent peripheral point of the plurality of preset points,
and the respective mapping ratio for each of the plurality of zones is an average of three side length ratios each being a side length of one side a pupil center point triangle over a side length of a corresponding side of a corresponding preset point triangle.

10. The apparatus of claim 9, wherein the plurality of peripheral points form a regular polygon centered on the center point.

11. An apparatus comprising:
a display device to generate a target screen;
a camera to capture eye images;
a computer readable storage medium to store instructions; and
a processor adapted to execute the instructions to perform a method of:
capturing a real time eye image using the camera;
obtaining a real time pupil center point from the real time eye image;
determining a gaze target zone based on the real time pupil center;
obtaining a gaze point on the target screen based on the real time pupil center point and a mapping ratio for the gaze target zone;
dividing the target screen into a plurality of zones;
obtaining a respective mapping ratio for each of the plurality of zones;
capturing, using the camera, a plurality of reference eye images each being of an eye looking at one of a plurality of preset points on the target screen;
obtaining a plurality of pupil center points each for one of the plurality of reference eye images; and
obtaining a plurality of corrected pupil center points and obtaining a corrected real time pupil center point;
wherein to obtain a corrected pupil center point of the plurality of pupil center points and the real time pupil center point comprises:
obtaining an eye ball radius r; and
obtaining a first corrected pupil center coordinate as $r*x/sqrt(r^2-x^2)$ and a second corrected pupil center coordinate as $r*y/sqrt(r^2-y^2)$, wherein x and y are x-axis and y-axis coordinates of a pupil center point before correction, "*" is multiplication, "/" is division and sqrt is square root,
wherein the first corrected pupil center coordinate has a same +/− sign as x and the second corrected pupil center coordinate has a same +/− sign as y.

12. The apparatus of claim 11, wherein to obtain one pupil center point of the plurality of pupil center points and the real time pupil center point further comprises:
obtaining a grayscale converted image from a respective eye image;
performing a binarization operation and an opening operation on the grayscale converted image;
obtaining a pupil contour after the binarization operation and opening operation on the grayscale converted image; and
obtaining the pupil center point using a centroid method on the pupil contour.

13. The apparatus of claim 12, wherein to obtain one pupil center point of the plurality of pupil center points and the real time pupil center point further comprises denoising the grayscale converted image.

* * * * *